INVENTOR.
DANIEL McKEOWN

BY
AGENT

Dec. 23, 1969 D. McKEOWN 3,486,023
ENERGY TRANSFER PROBE HAVING A TEMPERATURE
SENSITIVE QUARTZ CRYSTAL DETECTOR
Filed April 21, 1966 3 Sheets-Sheet 3

INVENTOR.
DANIEL McKEOWN

BY

AGENT

United States Patent Office 3,486,023
Patented Dec. 23, 1969

3,486,023
ENERGY TRANSFER PROBE HAVING A TEMPERATURE SENSITIVE QUARTZ CRYSTAL DETECTOR
Daniel McKeown, La Jolla, Calif., assignor to General Dynamics Corporation, a corporation of Delaware
Filed Apr. 21, 1966, Ser. No. 544,256
Int. Cl. G01t 1/16
U.S. Cl. 250—83.3    10 Claims

ABSTRACT OF THE DISCLOSURE

A temperature sensitive quartz is plated with a surface material. When placed in a beam of a radiant source, the energy transferred to the plating can be determined by changes in the oscillating frequency of the crystal.

---

This invention relates to a method and apparatus for measuring the transfer of energy between a radiant source and a surface. When a molecular beam is reflected from a surface, it gives up part of its kinetic energy as a result of the interaction. At energies below a few hundred ev., most of the energy transferred is released as heat since atoms ejected from the surface by the beam will carry little of the energy away. In studying molecular beam interactions it is important to know what fraction of the energy is transferred. If the amount of energy transferred can be measured, the accommodation coefficient of the surface can be determined and the nature of the interaction will be better understood.

The usual way of measuring energy transfer is by attaching a thermocouple to the target. This approach works well at high beam energy but at energies below 1 kev. it does not have the required sensitivity.

The present invention uses quartz crystals to measure energy transfer because its oscillating frequency is temperature dependent. By using special cuts of quartz the frequency dependence can be enhanced, and crystals offer a good replacement for thermocouples at low energies.

There are several advantages in using quartz crystals to measure energy transfer. Quartz dissipates heat poorly and a small heat flux will produce a relatively large increase in the temperature of a crystal. Many different materials can be plated or bonded onto quartz. It is a stable substance and can be used in a vacuum at high temperatures. Its frequency-temperature coefficient remains relatively constant down to 0° K.

The method makes use of temperature sensitive Y-cut quartz crystals. The crystal is placed in the beam and the energy transferred to its plating is determined by changes in its oscillating frequency. In the preferred embodiment, crystals having a fundamental frequency of 10 mc. are used and an energy transfer rate of 50 $\mu$w. could be detected.

In general, the present method and apparatus comprises a temperature sensitive quartz crystal plated with a surface material. When placed in a molecular beam or radiant source of energy, the transfer of energy to the plating is determined by changes in the oscillating frequency of the crystal. The frequency difference which occurs by this change is directly related to the energy transferred.

There are various applications for the present disclosed appparatus, one for instance the determination of attitude of a space vehicle relative to the earth's horizon. Because of its ability to sense infrared radiation, the apparatus is able to scan the horizon. Infrared radiation which is received from the earth's cloud cover in this case, will register a higher temperature than when the line of direction comes from outer space. Another application of this apparatus would be in determining the amount of energy that is transferred by a vehicle to molecules in the upper atmosphere when traveling through space which accordingly would determine the drag of a satellite or space vehicle. Furthermore, the apparatus can be used to measure energy accommodation coefficients of surfaces due to molecular impacts or surface absorptances due to incidence electromagnetic radiation.

It is therefore an object of the present invention to use a crystal as a sensor for energy transfer to a surface.

It is another object of the present invention to provide a method for measuring temperature changes on a surface to a sensitivity range of $1 \times 10^{-5}$° C.

It is another object of the present invention to detect an energy transfer to a surface due to particle impacts or infrared radiation.

It is another object of the present invention to provide a probe to measure energy accommodation coefficients of surfaces for use in satellite drag determinations and heat transfer predictions between gases and solids.

It is another object of the present invention to provide a probe for measuring the amount of electromagnetic-energy transferred to a surface by infrared radiation to determine the reflectivity of surfaces.

It is another object of the present invention to provide a device for scanning the horizon by measuring energy increase of infrared radiation through an optical filter capable of passing $CO^2$ thermal radiation from the earth's cloud cover.

Furthermore, this invention provides other objects, features and advantages which will become fully apparent from the following detailed description taken in conjunction with the accompanying drawings which illustrate and clarify the preferred embodiment of this device.

In short, the energy transfer measuring device for outer space use comprises, an enclosure with a compartment having an outward facing apertured bulkhead and a collimating bulkhead. Next to this compartment is a second compartment which carries a sensor crystal having a material plated surface facing adjacent the collimating bulkhead and a reference crystal with the same frequency characteristics as the sensor crystal. A third compartment in the enclosure is divided by several partitions into areas wherein is mounted the electronic means for handling the received data from the crystals. Accordingly, there is a first oscillator, a second oscillator, a mixer, and a filter circuit. The first oscillator and second oscillator are connected to the sensor crystal and reference crystal respectively and both oscillators are connected to the mixer and filter circuit. The mixer circuit is connected to the filter circuit for yielding the frequency difference between the first and second oscillator whereby the change in the frequency difference is a measure of the energy transfer received by the plated material on the sensor crystal.

Figure 1:
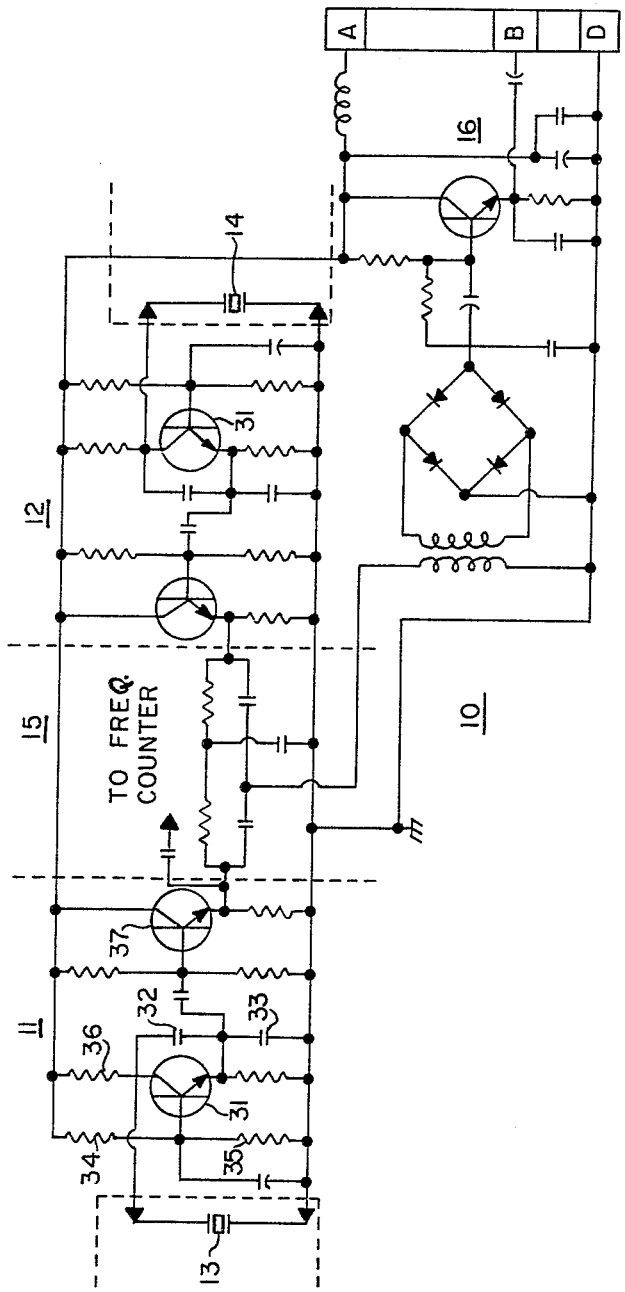
FIGURE 1 illustrates the circuit diagram of the preferred embodiment of the energy transfer device.

Referring now to the drawings wherein like referenced characters designate corresponding parts throughout the several views, there is shown in FIGURE 1, a circuit diagram 10 of the preferred embodiment of the energy transfer measuring device for outer space use, having modified transistorized Colpitts oscillators 11 and 12. Each circuit uses a sensor crystal 13 and reference crystal 14 respectively. A mixer circuit 15 connectes to both oscillator circuits 11 and 12 and is further connected to a filter circuit 16.

In FIGURES 2, 3, 5, and 6, there are shown test curves which relate to the crystal operation and are shown for the purpose to substantiate the operate of the device described hereinafter.

Figure 4:
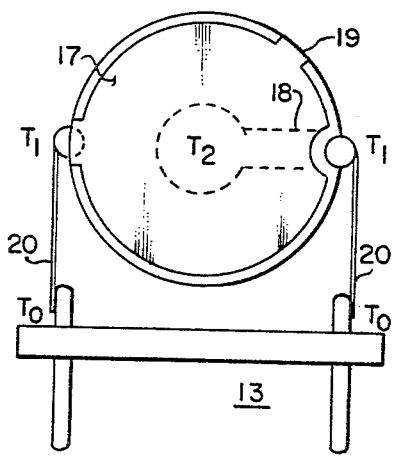
FIGURE 4 illustrates the mounting of the target crystal having a plating on one side and conductor on the other side.
Figure 7:
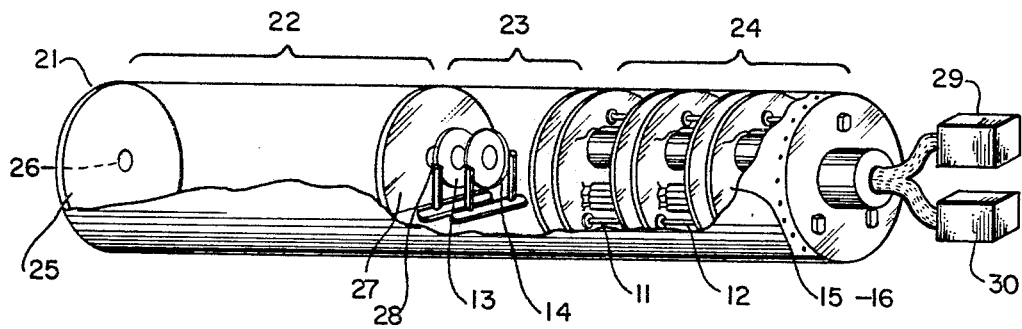
FIGURE 7 is a perspective view of the energy transfer device.

FIGURE 4 illustrates the embodiment of the sensor crystall 13. One side of the crystal 13 is plated with a material 17 on which energy transfer measurements are to be made. This material 17 could be gold, silver, aluminum, etc. If the plating 17 is a conductor, it can also be used as one of the electrodes needed to drive the crystal in oscillation, otherwise a conducting electrode 18 must be first plated onto the crystal 13. A calibration tab 19 is provided at the upper edge of the plated-on material 17. The crystal 13 is supported by two wires 20 having clips and being of very small dimensions, for example, .6 cm. long and .015 cm. diam. In FIGURE 7 there is shown the assembled temperature measuring energy transfer device as a probe. An enclosure or container 21 is divided by partitions into a first compartment 22, a second compartment 23, and a third compartment 24 which is under divided in small circuit sections. The first compartment 22 is provided with an outside bulkhead 25 having a small aperture 26, and a collimating bulkhead 27 with an aperture 28. A certain distance is provided in the first compartment 22 so that the apertures 26 and 28 will function collinear, or in other words, to direct in a straight line the molecular beam or infra-red beam. The sensor crystal 13 and the reference crystal 14 are mounted inside the second compartment 23. The sensor crystal is directely positioned adjacent the aperture 28 with its plated surface 17 towards the aperture 26. In the compartment 24 there is shown the electronic components forming a circuit for the first oscillator 11, the second oscillator 12 and the mixer 15 and filter 16. The input to the device is provided by a power supply 29 and the output is fed into a telemetry equipment 30 or the like.

Having thus described the various figures with reference characters, the operation of the device and its theory involved is as follows:

The most impotrant component in the device is the crystal and oscillator circuit. In order to provide a clear understanding of the operation of this device, further discussion is deemed necessary. The frequency change of a crystal produced by a temperature change can be sensed by using it as an active element in an oscillator. A modified transistorized Colpitts oscillator best fits my needs. A diagram of the oscillator 11 is shown in FIGURE 1. It works well with crystals having fundamental frequencies between 10 and 20 mc. A 2N736 transistor 31 is used because of its good high frequency characteristics. The 180° phase shift of the feedback signal is accomplished by the capacitor network C32 and C33. Base bias is provided by R34 and R35. Resistor 36 is the collector load. A 2N338 emitter 37 follower isolates the oscillator from the frequency counter. A Hewlett-Packard 524–C counter (not shown) was used for frequency measurements.

One oscillator can be used effectively if the temperature change is at least a few hundredths of a degree centigrade. For smaller changes, it is best to use two oscillators 11 and 12 with matched crystals, and take the beat frequency as the output. The output is taken from the 2N338 emitter 37 follower when the single crystal oscillator is used, and pin B when two oscillators and crystals are used as shown in FIGURE 1.

Experimentally, the crystals are located together when dual oscillators are employed. Any ambient temperature change is effectively cancelled in the beat because the frequency of both oscillators will increase or decrease together. Temperature changes due to molecules incident on the target crystal will produce a corresponding change in the beat frequency. This method of beating two oscillators increases the sensitivity of a quartz crystal to a temperature change over the single oscillator by at least an order of magnitude, depending on how carefully the crystals are matched, and is well worth the trouble of building the additional circuits. Also, the beat frequency can be brought down into the low frequency range, and a less expensive counter than the Hewlett-Packard model 524–C can be used.

Figure 2:
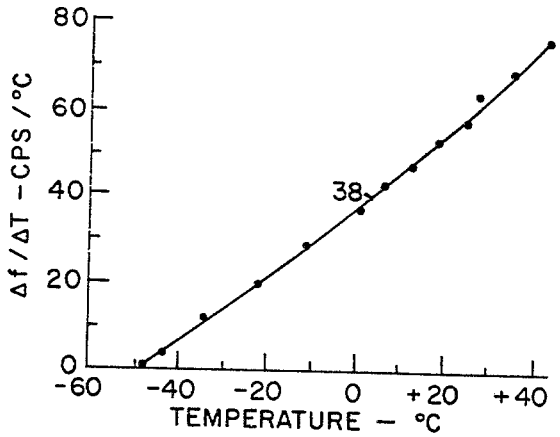
FIGURE 2 shows a plot of the frequency change of a 10 mc. crystal with temperature.
Figure 3:
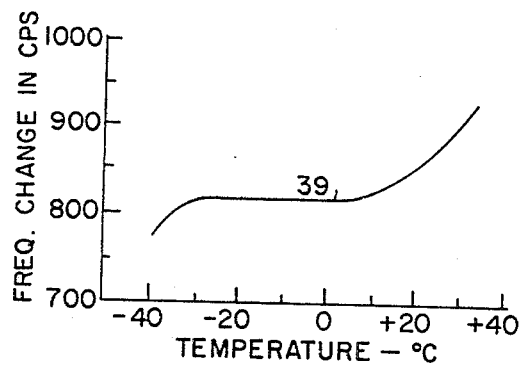
FIGURE 3 shows a plot of the change in crystal frequency per degree centigrade with temperature.

Preferably a Y-cut quartz crystal for energy transfer measurements is used because it has the largest frequency vs. temperature coefficient of any cut of quartz. The coefficient, $k$, has an average value of 86 p.p.m. (parts per million) per degree centigrade. A plot 38 of the frequency change of a 10 mc. crystal with temperature is shown in FIGURE 2. The change 39 in crystal frequency per degree centigrade as a function of temperature is shown in FIGURE 3.

The rate of change of the crystal frequency due to temperature changes is dependent upon the fundamental frequency, $f$, of the crystal. The fundamental frequency of a crystal is inversely proportional to its mass.

$$df/dt \propto k/m \propto f/f^{-1}$$
$$df/dt \propto f^2$$

where:

$f$ is the crystal fundamental frequency
$k$ is the temperature coefficient of the crystal
$m$ is the mass of the crystal.

The higher the fundamental frequency of a crystal, the more sensitive is its frequency change to temperature variations. For cases in which the mass of the crystal is much greater than the plating mass, the frequency change increases with the square of the fundamental frequency. At present, we are using crystals in the laboratory having fundamental frequencies of 10 and 20 mc./sec. to measure the energy transfer from molecular beams. The 10 mc./sec. crystal can detect temperature changes of $1 \times 10^{-4}$° C. while 20 mc./sec. crystals can detect changes of $2 \times 10^{-5}$° C.

Experiments were conducted at room temperature using dual oscillators. The crystals used in the oscillators were matched to have the same frequency change per degree centigrade between 20 and 30° C. Using dual 10 mc. oscillators, it was possible to measure temperature changes of $1 \times 10^{-3}$° C. that were produced by molecular impacts. Using dual 20 mc. oscillators it was possible to measure temperature changes of $2 \times 10^{-4}$° C.

Better temperature resolution could be attained, though, near 0° C. because the change in crystal frequency as a function of temperature goes through a minimum in this temperature region. Tests showed that when the ambient temperature of the crystals was controlled by an ice bath, it was possible to measure temperature changes of $1 \times 10^{-4}$° C. with 10 mc. crystals and $2 \times 10^{-5}$° C. with 20 mc. crystals. No further resolution than this was possible because of crystal frequency drift caused by changes in the drive level of the crystal.

The drive level is the amount of power required to sustain the oscillation of the crystal. This amounts to a few milliwatts and will vary if the power supply driving the oscillator is unstable. When the drive level changes, the temperature of the crystal will fluctuate and its frequency will drift. If variations in the drive level are large, it will limit the temperature resolution of the crystal produced by impacts. These variations can be minimized by carefully matching the crystals used in the dual oscillators and using a well regulated power supply.

The rate of change of the crystal temperature due to molecular impacts is $$dT/dt = (\alpha E - H)/mc_p$$

The accommodation coefficient ($\alpha$) is the fraction of the beam energy transferred to the crystal. The energy (E) carried by the beam, and the heat (H) dissipated by the crystal are in watts. The mass of the crystal is $m$ in grams, and $c_p$ is its heat capacity in joule/gram-degree-centigrade.

The total amount of material 17 can be plated on a crystal 13 before it significantly damps its oscillation is approximately 10,000 A. for a light material such as aluminum and 1,000 A. for a heavy material such as gold. Nearly the entire surface of the crystal 13 is plated to permit measurements with beams having a circular cross section of up to 0.1 cm. in diam.

Another electrode 18 must also be plated on the back side of the crystal to complete the driving circuit. It has a radius of 2 mm. as measured from the center of the crystal so as to keep the plating capacity low and assure a good oscillating amplitude.

The calibration tab 19 is used to drive an electrical current through the plating so that the frequency change of the crystal can be determined when a known amount of power is dissipated at its surface.

The heat dissipated by the crystal to the surroundings is $$H = (k_1 a_1/l_1 + k_2 a_2/l_2)(T_2 - T_1) + (k_3 a_3/l_3)(T_1 - T_0) + \sigma a_4 (T_2^4 - T_0^4)$$

The heat conductivity of quartz 13, the plating 17, and wires 20 holding the crystal are $k_1$, $k_2$, and $k_3$, respectively, in Joule/degree centigrade cm. sec. The cross-sectional area normal to the heat flow is $a_1$, $a_2$, and $a_3$ in centimeters squared. The conducting path length along the direction of heat flow is $l_1$, $l_2$, and $l_3$ in centimeters. The temperature at the center of the crystal where the beam impacts is $T_2$. The temperature at the edge of the crystal is $T_1$, and $T_0$ is the ambient temperature. The Stefan-Boltzmann constant is $\sigma$, and $a_4$ the area of the radiating surface in centimeters squared.

For short bombardment periods $H \approx 0$, and the energy transferred to the crystal can be found from measuring its temperature change. It was calculated that for a bombardment period $T < 10$ sec., $H < 0.03 \alpha E$, and $\alpha E = mc_p dT/dt$ to within 3%.

Knowing the energy carried by the molecular beam, the accommodation coefficient can also be found and $$\alpha = (mc_p/E) dT/dt$$

Figure 5:
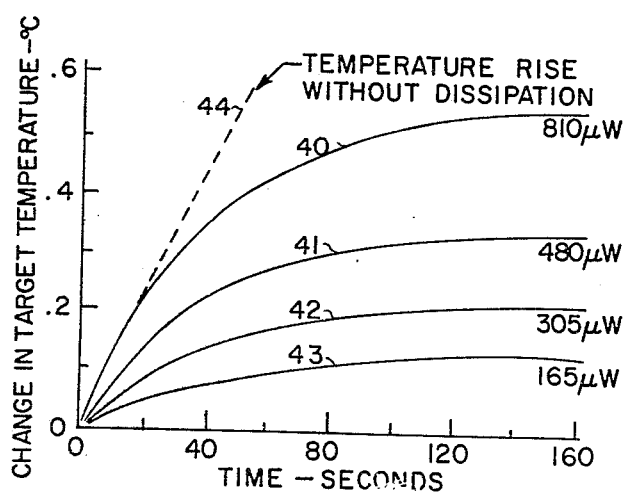
FIGURE 5 is a plot showing the frequency rise of a crystal when power is dissipated in its plating.

Experimentally it was shown that the energy dissipated by the crystal 13 over short periods is much less than the energy transferred from the beam for temperature changes of less than 1° C. The temperature rise of a crystal for various known amounts of electrical power dissipated in its plating is shown in FIGURE 5. Data were taken every 2 sec. The curves 40, 41, 42, 43 do not pass through the origin since there is about a 2 sec. uncertainty as to when the power was turned on. The measured temperature rise for the first 10 sec. of usable data is within a few percent of the calculated rise for the different power inputs assuming no heat is lost to the surroundings. The dashed line 44 for the 810 μw. power input is the temperature the crystal would have reached at any time ($t$) if no heat was lost to the surroundings.

Figure 6:
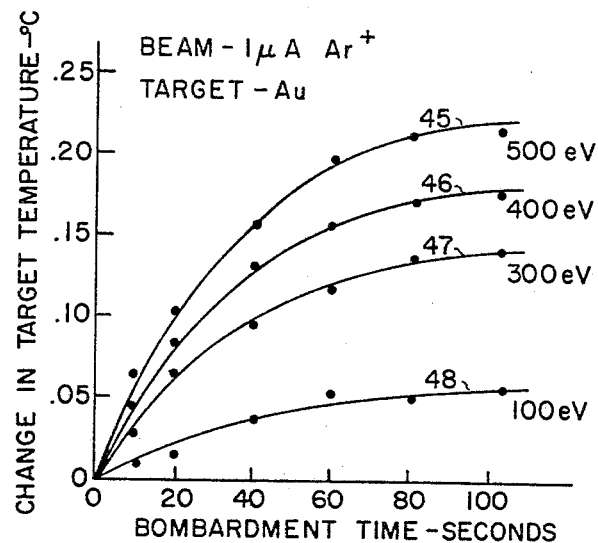
FIGURE 6 shows a plot which derived from measurements of the frequency increases of the crystal for beam impacting at energies between 100 and 500 ev.

In FIGURE 6 there is shown the results of measurements of the frequency increases of the crystal for beam impacting at energies between 100 and 500 ev., as plotted by the curves 45–48. The curves relate to measurements which were made on the energy transfer from a beam of Ar+ to a Au surface. An ion beam generator was used in this test in which the ions were extracted from the ion source, focused, accelerated, and passed onto the Au surface. The measurements achieved show the fraction of the kinetic energy of the beam accommodated by the surface. The results of these measurements in terms of a temperature rise are shown in FIGURE 6, with an accuracy of 5%. By using the temperature rise during the first 10 sec. of bombardment, it was found that the beam transferred 0.75 of its energy at 100 ev. For higher impact energies, the transfer of energy increased and reached 0.80 at 500 ev.

In order to measure energy transfer below 100 ev., 10 mc. crystals are not sensitive enough for such measurements. A four fold increase in sensitivity could be obtained by using 20 mc. crystals thus with higher frequency crystals it is possible to make measurements at beam energies of 10 ev. with a moderate increase in beam current.

It can be easily seen that the advantages of this device are considerable in comparison with thermocouple temperature sensing devices, such as the crystal's ability to sense to the $$\frac{2}{100,000° \text{C.}}$$

the direct readout through digital information of the frequency, etc. In summary, the general idea of the present method and device provide the use of a temperature sensitive quartz crystal which is plated with a surface material. When placed in a beam of a radiant source the energy transferred to the plating is determined by changes in the oscillating frequency of the crystal. The frequency difference which occurs by this change is directly related to the energy transfer to the crystal and can be measured to $2 \times 10^{-5}$° C.

The above explained theory and tests have been proven to be accurate in a prototype which is shown in perspective fashion in FIGURE 7.

This invention is not to be construed as limited to the particular form disclosed hereinabove, since the embodiment shown is intended to be illustrative rather than restrictive, and it should be understood that the inventor wished to enclose within the scope of the patent warranted hereon all modifications to the illustrations as reasonably and properly come within the scope of the inventor's contribution to the art.

I claim:

1. An energy transfer measuring device comprising in combination:
    (a) an enclosure with a first compartment having means for directing a straight line of sight for receiving molecular beams,
    (b) a second compartment next to said first compartment,
    (c) a sensor crystal located in said second compartment having a material plated surface facing adjacent said straight line directing means,
    (d) a reference crystal having the same frequency characteristics as said sensor crystal located adjacent said sensor crystal,
    (e) a third compartment in said enclosure having a first oscillator and a second oscillator,
    (f) said first oscillator connected to said sensor crystal,
    (g) said second oscillator connected to said reference crystal, and
    (h) a fourth compartment with electronic circuit means connected to said first and said second oscillator for yielding the frequency difference between said first and said second oscillator whereby the change in said frequency difference is a measure of the energy transfer received by said plated material on said sensor crystal.

2. The energy transfer measuring device as claimed in claim 1, wherein said straight line of sight directing means comprises a first and second bulkhead mounted in said first compartment at spaced apart locations and provided with an aperture in each of said bulkheads for straight line of sight receiving of molecular beams.

3. The energy transfer measuring device as claimed in claim 1, wherein said means connected to said first and second oscillators comprises a mixer circuit connected to said first and second oscillators and a filter connected to said mixer circuit for yielding the frequency difference between said first and second oscillators, whereby a change in said frequency difference is a measure of the energy transfer received by said plated material on said sensor crystal.

4. The energy transfer measuring device as claimed in claim 1, wherein said sensor crystal and said reference crystal are sensitive "Y" cut quartz crystals.

5. An energy transfer measuring device comprising in combination:
   (a) an enclosure having an apertured bulkhead,
   (b) a transducer temperature sensitive piezoelectric crystal having a face adjacent said apertured bulkhead,
   (c) a material plated on said transducer crystal and faced adjacent said apertured bulkhead,
   (d) a reference piezoelectric crystal near said transducer crystal and having the same resonant frequency and temperature characteristics as said transducer crystal,
   (e) a first oscillator circuit connected to said transducer crystal,
   (f) a second oscillator circuit connected to said reference crystal, and
   (g) means connected to said first and second oscillators for yielding the frequency difference between said first and second oscillators, whereby a change in said frequency difference is a measure of the energy transfer received by said plated material on said sensor crystal.

6. The energy transfer measuring device as claimed in claim 5 wherein said sensor crystal and references crystal are temperature sensitive "Y" cut quartz crystals.

7. The energy transfer measuring device as claimed in claim 5 wherein said means connected to said first and second oscillators comprises a mixer circuit connected to said first and second oscillators and a filter circuit connected to said mixer for yielding the frequency difference between said first and second oscillators, whereby a change in said frequency difference is a measure of the energy transfer received by said plated material on said sensor crystal.

8. A device for measuring the energy accommodation for surfaces, comprising in combination:
   (a) an enclosure with a first compartment having an outward facing apertured bulkhead and a collimating bulkhead provided with an aperture,
   (b) a temperature sensitive piezoelectric crystal in said second compartment having a face adjacent said apertured collimating bulkhead,
   (c) a test material plated for energy accommodation measurement, on said crystal, facing said collimated apertured bulkhead,
   (d) a reference piezoelectric crystal in said second compartment and having the same frequency temperature sensitive characteristics as said transducer crystal,
   (e) a third compartment in said enclosure,
   (f) a first oscillator circuit in said third compartment connected to said transducer crystal, a second oscillator circuit in said third compartment connected to said reference crystal, and circuit means in said third compartment connected to said first and second oscillators for yielding the frequency differenec between said first and second oscillators, whereby a change in said frequency difference is a measure of the energy transfer received by said plated material on said transducer crystal.

9. The device as claimed in claim 7 wherein said means connected to said first and second oscillators comprises a mixer connected to said first and second oscillators and a filter connected to said mixer for yielding the frequency difference between said first and second oscillators, whereby a change in said frequency difference is a measure of the energy transfer received by said plated material on said sensor crystal.

10. An energy transfer probe adapted for horizon scanning by detecting energy transfer due to infra-red radiation comprising in combination:
   (a) a collimating means,
   (b) a pair of temperature sensitive piezoelectric crystals having identical frequency characteristics,
   (c) one of said crystals plated with a material and mounted adjacent said collimating means for receiving said infra-red radiation in a straight line of sight,
   (d) said other crystal mounted at a spaced location from said one crystal,
   (e) each said crystals being connected to individual oscillator circuit means and being exposed to an identical environmental temperature,
   (f) said one crystal receiving infra-red radiation and thereby influenced by radiant energy to oscillate at a higher frequency, and
   (g) said oscillator means connected to electrical circuit means having mixer and filter circuits for yielding the frequency difference between said oscillator means whereby the change in said frequency difference is a measure of the energy transfer received by said plated material on said one crystal and indicative to the position of said collimating means in conjunction with horizon line scanning.

References Cited

UNITED STATES PATENTS

| 2,500,473 | 3/1950 | Spaeth | 250—83.3 |
| 2,957,081 | 10/1960 | Chapman | 250—83.3 |
| 3,050,627 | 8/1962 | Miller | 250—83.3 |
| 3,084,253 | 4/1963 | McHenry et al. | 250—83.3 |
| 3,188,472 | 6/1965 | Whipple | 250—83.3 |
| 3,255,351 | 6/1966 | Walsh et al. | 250—83.3 X |

ARCHIE R. BORCHELT, Primary Examiner

U.S. Cl. X.R.

250—83